(12) United States Patent
Prada Delgado et al.

(10) Patent No.: US 11,977,856 B2
(45) Date of Patent: May 7, 2024

(54) RANDOM NUMBER GENERATION FROM SRAM CELLS

(71) Applicant: International Business Machines Corporation, Armonk, NY (US)

(72) Inventors: Miguel Angel Prada Delgado, Rueschlikon (CH); Gero Dittmann, Zürich (CH)

(73) Assignee: International Business Machines Corporation, Armonk, NY (US)

( * ) Notice: Subject to any disclaimer, the term of this patent is extended or adjusted under 35 U.S.C. 154(b) by 652 days.

(21) Appl. No.: 17/157,325

(22) Filed: Jan. 25, 2021

(65) Prior Publication Data

US 2022/0236953 A1    Jul. 28, 2022

(51) Int. Cl.
*G06F 7/58* (2006.01)
*G06F 3/06* (2006.01)

(52) U.S. Cl.
CPC .......... *G06F 7/588* (2013.01); *G06F 3/0604* (2013.01); *G06F 3/0655* (2013.01); *G06F 3/0673* (2013.01)

(58) Field of Classification Search
CPC ......... G06F 7/588; G06F 3/0601–0604; G06F 3/0628–0635; G06F 3/0638; G06F 3/0653; G06F 3/0655; G06F 3/0673; G06F 3/0679; G06F 3/0688
See application file for complete search history.

(56) References Cited

U.S. PATENT DOCUMENTS

| | | | |
|---|---|---|---|
| 10,157,043 B2 | 12/2018 | Lu | |
| 2014/0040338 A1 | 2/2014 | Erik | |
| 2017/0048072 A1* | 2/2017 | Cambou | G11C 15/046 |
| 2019/0182054 A1* | 6/2019 | Leobandung | H04L 9/0869 |
| 2020/0036539 A1* | 1/2020 | Hung | H04L 9/0816 |

FOREIGN PATENT DOCUMENTS

WO     2015140365 A1     9/2015

OTHER PUBLICATIONS

"EPO Global Dossier ES2015000038", European Patent Office, downloaded from the internet on Jan. 13, 2021, 1 page, <https://register.epo.org/ipfwretrieve?apn=ES.2015000038.W&lng=en>.
"Hardware random number generator", Wikipedia, last edited on Dec. 27, 2020, 11 pages, <https://en.wikipedia.org/wiki/Hardware_random_number_generator>.

(Continued)

*Primary Examiner* — Emily E Larocque
(74) *Attorney, Agent, or Firm* — Monchai Chuaychoo

(57) ABSTRACT

Methods are provided for generating a random bit-string from an array of SRAM cells. Such a method includes reading the start-up value of each cell over multiple power-ups of the array, and calculating, from the multiple start-up values of each cell, a bias value indicative of entropy of that cell. The method also includes generating, based on the bias values, an address list in which addresses of cells in the array are listed in order of entropy of the cells. This address list is stored in non-volatile memory. The method further comprises, on a subsequent power-up of the array, generating a random bit-string by reading the start-up values of a set of cells selected in decreasing entropy order of the address list. Hardware random number generators exploiting such methods are also provided.

20 Claims, 8 Drawing Sheets

(56) References Cited

OTHER PUBLICATIONS

Baturone et al., "Improved Generation of Identifiers, Secret Keys, and Random Numbers from SRAMs", IEEE Transactions on Information Forensics and Security, 2015, DOI: 10.1109/TIFS.2015.2471279, 16 pages.
Courtois, Nicolas, "The Dark Side of Security by Obscurity—and Cloning MiFare Classic Rail and Building Passes, Anywhere, Anytime", Conference Paper, Jan. 2009, 110 pages.
Holcomb et al., "Power-Up SRAM State as an Identifying Fingerprint and Source of True Random Numbers", IEEE Transactions on Computers, vol. 58, No. 9, Sep. 2009, pp. 1198-1210.
Li et al., "PUFKEY: A High-Security and High-Throughput Hardware True Random Number Generator for Sensor Networks", Sensors 2015, 15, 26251-26266, doi: 10.3390/s151026251, Published Oct. 16, 2015, pp. 26251-26266.
Wang et al., "Aging-Resilient SRAM-based True Random Number Generator for Lightweight Devices", J Electron Test manuscript No. 2019, 10 pages.

\* cited by examiner

RANDOM NUMBER GENERATION FROM SRAM CELLS

BACKGROUND

The present invention relates generally to random number generation from SRAM (Static Random-Access Memory) cells. Methods are provided for generating random bit-strings using cell start-up values in SRAM arrays, together with computer program products and hardware random number generators implementing such methods.

Random number generation is a basic primitive in cryptography. Random numbers are used in numerous cryptographic protocols, e.g. as seeds or nonces for cryptographic key generation, data encryption protocols, cryptographic signatures, digital certificates, and so on. Such protocols are fundamental to security of data communications and are used in a wide variety of electronic devices, including processors, ICs (Integrated Circuits), HSMs (Hardware Security modules), smart cards, IoT (Internet of Things) sensors, network devices and computing devices generally.

Hardware random number generators (also known as "true random number generators") use the randomness inherent in some physical process as the basis for random number generation. The initial states assumed by SRAM cells on power-up of an SRAM array can provide such a source of randomness. SRAM cells are volatile memory cells which transition to one of two stable states, corresponding to start-up values of 0 or 1, when power is applied. These start-up values depend on the characteristics of individual cells and are also affected by noise. Some cells (stable cells) will assume the same start-up value on all power-ups. Others (neutral cells) will adopt different values in an essentially random manner. A bit-string obtained by reading the start-up values of an array of cells will thus incorporate some degree of randomness. The amount of randomness, or entropy, encoded in such a bit-string will vary from one array to another.

SUMMARY

A first aspect of the present invention provides a method for generating a random bit-string from an array of SRAM cells. The method includes reading the start-up value of each cell over multiple power-ups of the array, and calculating, from the multiple start-up values of each cell, a bias value indicative of entropy of that cell. The method also includes generating, based on the bias values, an address list in which addresses of cells in the array are listed in order of entropy of the cells. This address list is stored in non-volatile memory. The method further comprises, on a subsequent power-up of the array, generating a random bit-string by reading the start-up values of a set of cells selected in decreasing entropy order of the address list.

Another aspect of the invention provides a hardware random number generator comprising: an array of SRAM cells; non-volatile memory storing an address list in which addresses of cells in the array are listed in order of entropy of the cells; and control logic adapted, on a power-up of the array, to generate a random bit-string by reading the start-up values of a set of cells selected in decreasing entropy order of the address list. The control logic can be adapted to generate the address list based on the cell start-up values over multiple power-ups as in the method of the first aspect above.

A further aspect of the invention provides a computer program product comprising a computer readable storage medium embodying program instructions, executable by a processing device, to cause the processing device to perform the method of the first aspect.

DETAILED DESCRIPTION

SRAM cells are mainly used for generation of identifiers and secret keys as Physically Unclonable Functions (PUFs). True Random Number Generators (TRNG), also known as Hardware Random Number Generators (HRNG), typically use thermal noise, avalanche noise, or atmospheric noise to slowly gather randomness. The main issues with TRNG is slow speed and it can be easily alterable. Other approach exploit the difference between the frequencies of two or more independent Ring Oscillators (ROs). However, this approach had a disadvantage of having a high biased and sensitive to external factors.

Embodiments of the present invention recognizes the deficiencies in the current state of art associated with generating random numbers by devices (e.g., SRAM cells, etc.) and provides an approach to address system vulnerabilities (e.g., due to the lack of entropy, etc.). An example for addressing a lack of entropy, specifically in MIFARE Classic cards, the LFSR used by RNG is predictable (constant initial condition). Each random number (generated by the cards) only depends on the time when the reader was powered up and when the random number was requested.

The approach of the embodiment can provide a way to classify and extract the ordered cells (graphical change of SRAM start-up cells) by saving an array with the entropy of each cell ordered from higher to lower entropy. The approach can save an array with the address of each cell in the memory (also ordered by its entropy).

Other embodiments of the present invention may recognize one or more of the following facts, potential problems, potential scenarios, and/or potential areas for improvement with respect to the current state of the art: i) does not require additional hardware and can be implemented in any electronic device, ii) can statistically quantify the entropy of the randomness that will be generated in advance, iii) simple design is not based on obscurity which makes it attractive to clients concerned about security and iv) true randomness is a scarce resource in deterministic systems such as electronic device.

Embodiments of the invention will be described in more detail below, by way of illustrative and non-limiting example, with reference to the accompanying drawings.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
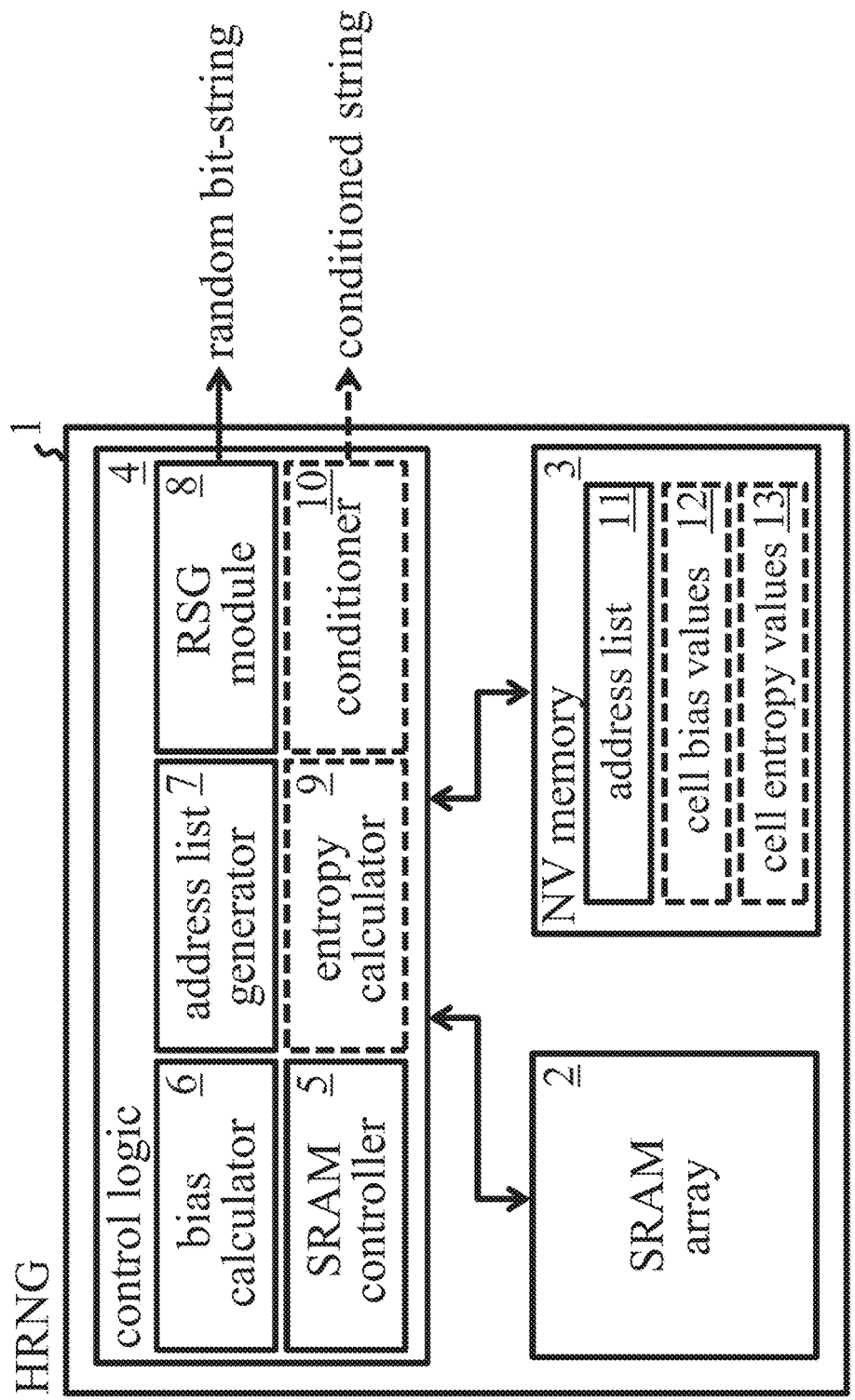
FIG. 1 illustrates component modules of a hardware random number generator embodying the invention.

The FIG. 1 schematic illustrates component modules of a hardware random number generator (HRNG) embodying the invention (Dashed lines in this figure indicate features of preferred embodiments, described later). The HRNG 1 comprises an array 2 of SRAM cells, non-volatile (NV) memory 3, and control logic indicated generally at 4. Control logic 4 comprises an SRAM controller 5, a bias calculator 6, an address list generator 7, and a random string generator (RSG) module 8. As indicated by the dashed lines, preferred embodiments also include an entropy calculator 9 and a conditioner module 10. Each of these logic modules 5 through 10 comprises functionality for implementing particular steps of a random bit-string generation process detailed below. Non-volatile memory 3 stores one or more data structures generated in operation of HRNG 1, including an address list 11 produced by address list generator 7. In preferred embodiments, NV memory 3 also stores a set of bias values 12 (generated by bias calculator 6) and a set of entropy values 13 (generated by entropy calculator 9) for the individual cells of SRAM array 2.

In general, the SRAM array 2 used by HRNG 1 may comprise all or a designated subset of cells in an SRAM memory device comprising one or more SRAM chips or packages of chips. This SRAM device need not be used solely for HRNG operation. HRNG 1 can thus exploit SRAM memory provided for any purpose in an electronic device/apparatus. Similarly, NV memory 3 may be a dedicated memory unit for HRNG 1, or may be provided by general-purpose non-volatile memory of a device/apparatus employing HRNG 1. NV memory 3 may be implemented by one or more memory components, e.g. one or a combination of registers, flash memory, EPROM, or any other non-volatile memory device.

Functionality of logic modules 5 through 10 may be implemented by software (e.g., program modules) or hardware or a combination thereof. Functionality described may be allocated differently between system modules in other embodiments, and functionality of one or more modules may be combined. The control logic functionality can be implemented by simple hardware circuits which may be provided as hardwired logic or programmable logic circuits, such as FPGAs. However, preferred embodiments implement the control logic functionality in software. The HRNG 1 can then be implemented in any processor-enabled device by programming simple software functions required for the HRNG operation detailed below.

Figure 2:
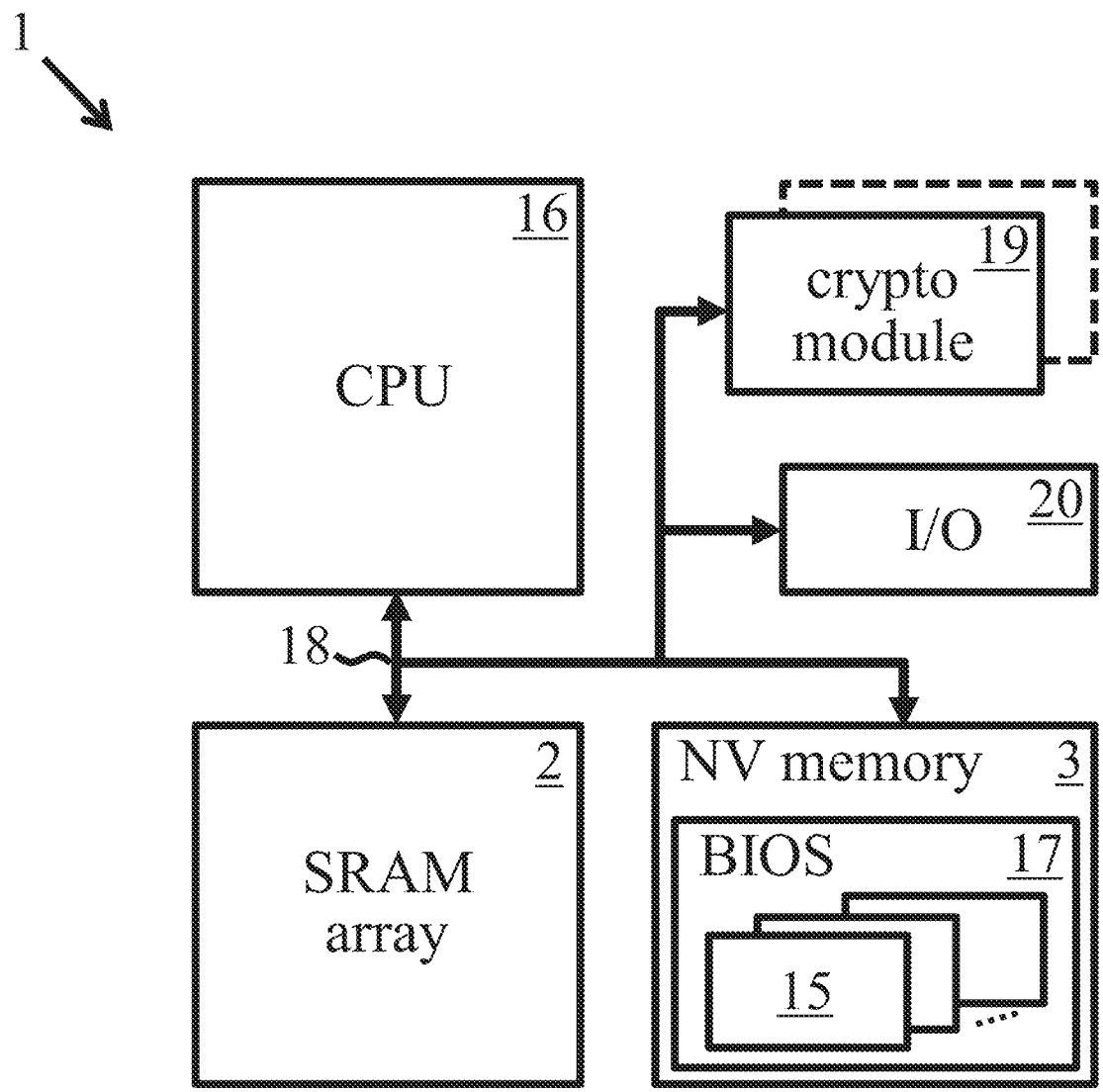
FIG. 2 illustrates architecture of an exemplary implementation of the hardware random number generator.

FIG. 2 is a schematic representation of the architecture of an exemplary implementation of HRNG 1. In this embodiment, the functionality of control logic 4 is implemented by program modules 15 which are executed by a processing unit, here CPU 16. CPU 16 may be dedicated to HRNG operation, or may be a general- or special-purpose processor of an electronic device employing HRNG 1. The program modules 15 are stored in NV memory 3 of this device. In particular, in this embodiment the program modules are stored in a BIOS ROM 17 for loading to CPU 16 at boot time. CPU 16 communicates with SRAM array 2 and NV memory 3 via one or more system buses represented schematically by bus 18 in the figure. The CPU also communicates with one or more cryptographic (crypto) modules 19 which implement cryptographic functions. Such functions may comprise cryptographic key generation, data encryption/decryption, device authentication/validation, digital signature generation, or any other cryptographic process requiring injection of random numbers. CPU 16 may be integrated with crypto module(s) 19 in some embodiments, e.g. in a secure processing unit of an HSM or SoC (System on Chip). CPU 16 also communicates with one or more I/O interfaces 20 (e.g. a user I/O interface, network interface, modem, etc.) for communications between CPU 16 and other devices. Communications may be via a physical or wireless connection and/or via a network (which may comprise one or more component networks and/or internetworks including the Internet). Specific functionality here depends on the particular apparatus in which HRNG 1 is employed, and this is orthogonal to the operation described herein. Bus 18 may comprise several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Figure 3A:
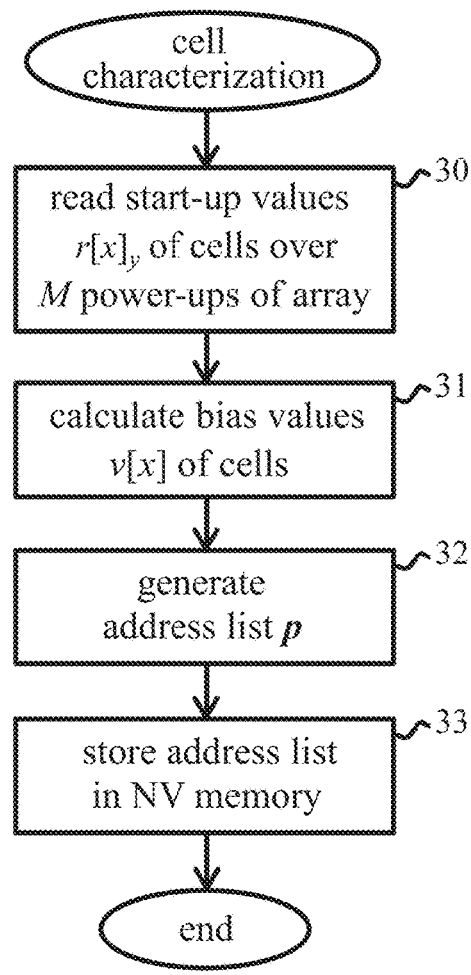
FIGS. 3a and 3b indicates steps of a method for generating a random bit-string performed by the hardware random number generator.
Figure 3B:
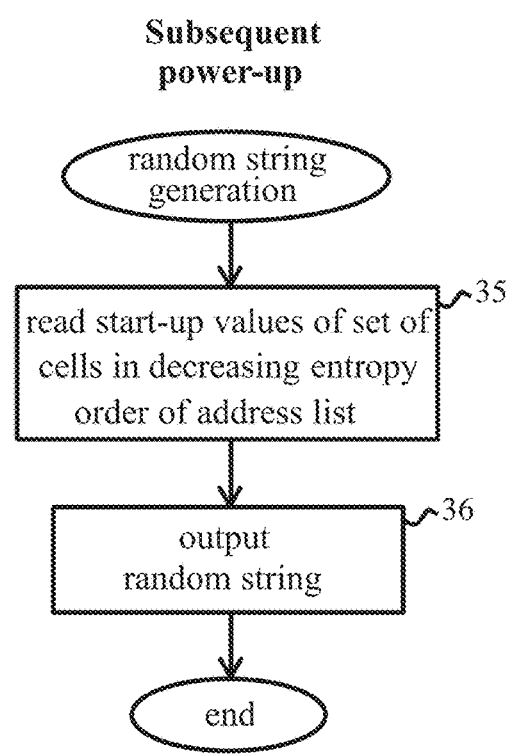

Basic steps of a method for generating a random bit-string in HRNG 1 are shown in FIGS. 3a and 3b. The method involves an initialization stage in which SRAM cells are characterized according to entropy of the cells. FIG. 3a shows this cell characterization process. In step 30, SRAM controller 5 reads the start-up value of each SRAM cell over multiple power-ups of SRAM array 2. In particular, for M power-ups of an array of N cells sx with addresses denoted here by x=0 to N−1, the start-up value r[x]y (y=0 to M−1) of each cell is read after each power-up. Between each power-up, the array is powered down for sufficient time for cells to revert to their unstable, zero-power state. The start-up values r[x]y are supplied to bias calculator 6. In step 31, bias calculator 6 calculates, from the multiple start-up values of each cell sx, a bias value (denoted by v[x]) indicative of entropy of that cell. The bias value v[x] for a cell provides some form of indication of the entropy associated with that cell and may be calculated in various ways as described below. The cell bias values v[x] are supplied to address list generator 7. In step 32, the address list generator uses these bias values to generate an address list in which the addresses x of cells in the array are listed in order of entropy of the cells. In step 33, the resulting address list, denoted here by p, is stored at address list 11 in NV memory 3. This completes the initialization phase of HRNG 1.

Following initialization, the HRNG can generate a random bit-string on any subsequent power-up of SRAM array 2 as shown in FIG. 3b. On power-up of the array, in step 35, the RSG module 8 generates the random bit-string by reading the start-up values of a set of cells selected in decreasing entropy order of the address list. The number of cells in this set may be determined in various ways as explained below. The resulting random bit-string is output in step 36, e.g. to a crypto module 19, and the HRNG operation is complete for the current power-up.

The above method thus characterizes entropy at the level of individual cells and produces address list 11 in which cell-addresses are listed in order of (increasing or decreasing) entropy. By generating random strings from a set of cells which are selected in decreasing entropy order of this list, the resulting string will be generated from the highest-entropy cells and will encode the maximum possible entropy for a given string-length. Since entropy is a scarce resource, this provides a significant improvement in use of SRAM arrays for random number generation. The method can be implemented by simple hardware circuits and, even more advantageously, by very simple software in any processor-enabled device without the need for additional hardware. Random numbers with maximum available entropy can thus be generated cheaply and efficiently in any type of electronic device.

The initialization of FIG. 3a may be performed, for example, on an initial power-up of SRAM array 2 in the device using HRNG 1. However, initialization can be performed at any convenient time, e.g. during any period in which the device SRAM (or the part thereof used as SRAM array 2 by the HRNG) is not required for other purposes. In some embodiments, and in particular where HRNG 1 is provided in a resource-constrained device (for instance, an electronic tag or e-ticket), the initialization stage could be performed during device manufacture. The address list used for string generation is then pre-stored in NV memory 3 for use in application of the device. Modules 5 through 7 of control logic 4 can be omitted from such embodiments. In preferred embodiments, however, the initialization is performed by HRNG 1 during device application, whereby the cells are characterized under true operating conditions of the application.

Figure 4A:
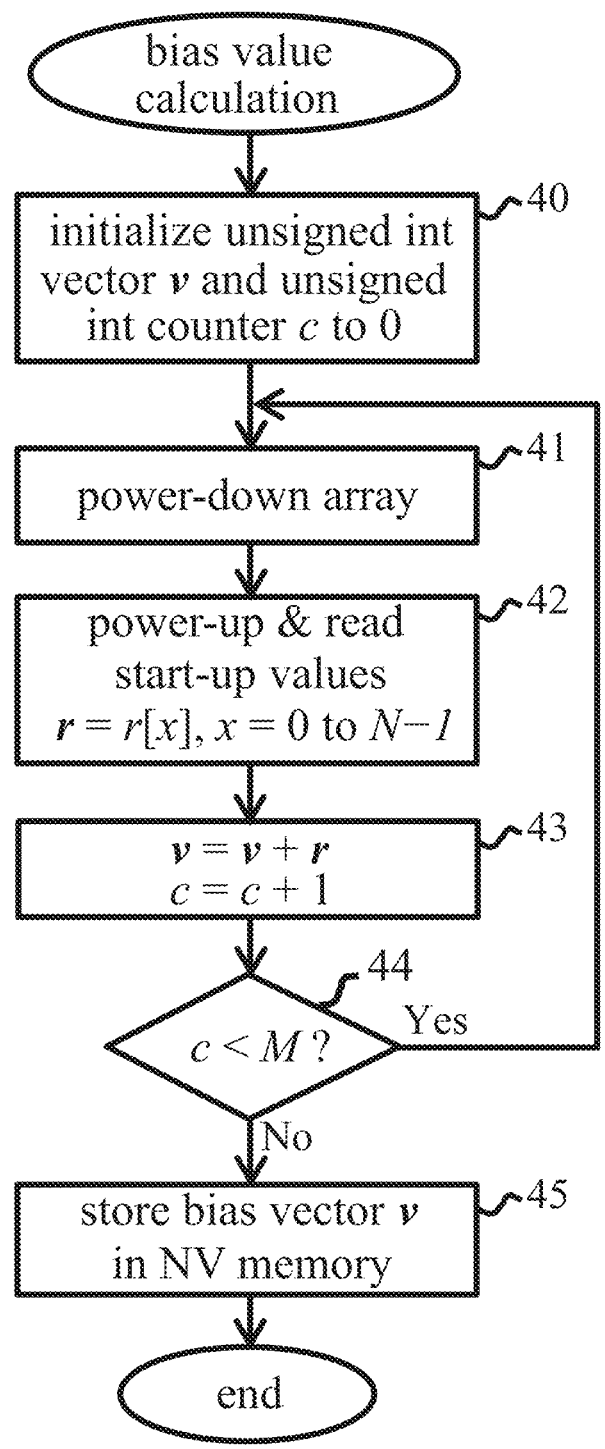
FIGS. 4a and 4b show more detailed steps of the FIG. 3a method in an embodiment of the invention.

More detailed steps of the initialization process in a preferred embodiment will be described with reference to FIGS. 4a and 4b. FIG. 4a shows the bias value calculation (steps 30 and 31 of FIG. 3a) in more detail. At the start of this process, as indicated at step 40, an unsigned integer (int) vector v, with N elements v[x], is initialized to zero in bias calculator 6. An unsigned integer counter c is also initialized to zero in SRAM controller 5. The process begins with the SRAM array 2 powered-down as indicated at step 41. In step 42, SRAM controller 5 powers-up the array and reads the vector r of start-up values r[x], x=0 to N−1, of the N cells. The start-up vector r is supplied to bias calculator 6. In step 43, the bias calculator adds r to v, and the SRAM controller increments the counter c. In decision step 44, the SRAM controller checks if c<M, where M is a predetermined number of power-ups for the initialization phase. If so, operation reverts to step 41 and the array is powered-down. Steps 42 to 44 are then repeated for the next power-up. The process thus iterates, with successive start-up values r[x] for each cell being accumulated in the corresponding elements v[x] of the vector v. When M loops have been completed, the resulting vector v (referred to hereinafter as the "bias vector") contains N elements ("bias values") v[x] each accumulating the M start-up values r[x] of a respective cell in the array. In step 45 of this embodiment, the bias vector v defining these cell bias values is stored at 12 in NV memory 3.

The bias value v[x] for a cell reflects the number of times, over M power-ups, that the cell assumed a start-up value of 1. As discussed earlier, some SRAM cells will be stable cells, always assuming the same start-up value, either 1 or 0. These cells will have bias values of v[x]=0 (all start up values=0), or v[x]=M (all start-up values=1) Other cells will have some degree of instability. These unstable cells are affected by noise and can assume different start-up values in a stochastic manner. Cells which start-up to 1 and 0 with equal probability (v[x]=M/2 for even M) are the most unstable and contribute the maximum entropy. Cells with v[x] between 0 and M/2, and between M and M/2, contribute increasing amounts of entropy on a scale from 0 to M/2, and M to M/2, respectively. Hence, a cell with bias value v[x]=1 has the same entropy as a cell with v[x]=(M−1). Similarly, bias values v[x]=2 and v[x]=(M−2) indicate equivalent cell entropy, and so on. The bias values v[x] thus indicate the amount of entropy associated with individual cells of SRAM array 2.

Figure 4B:
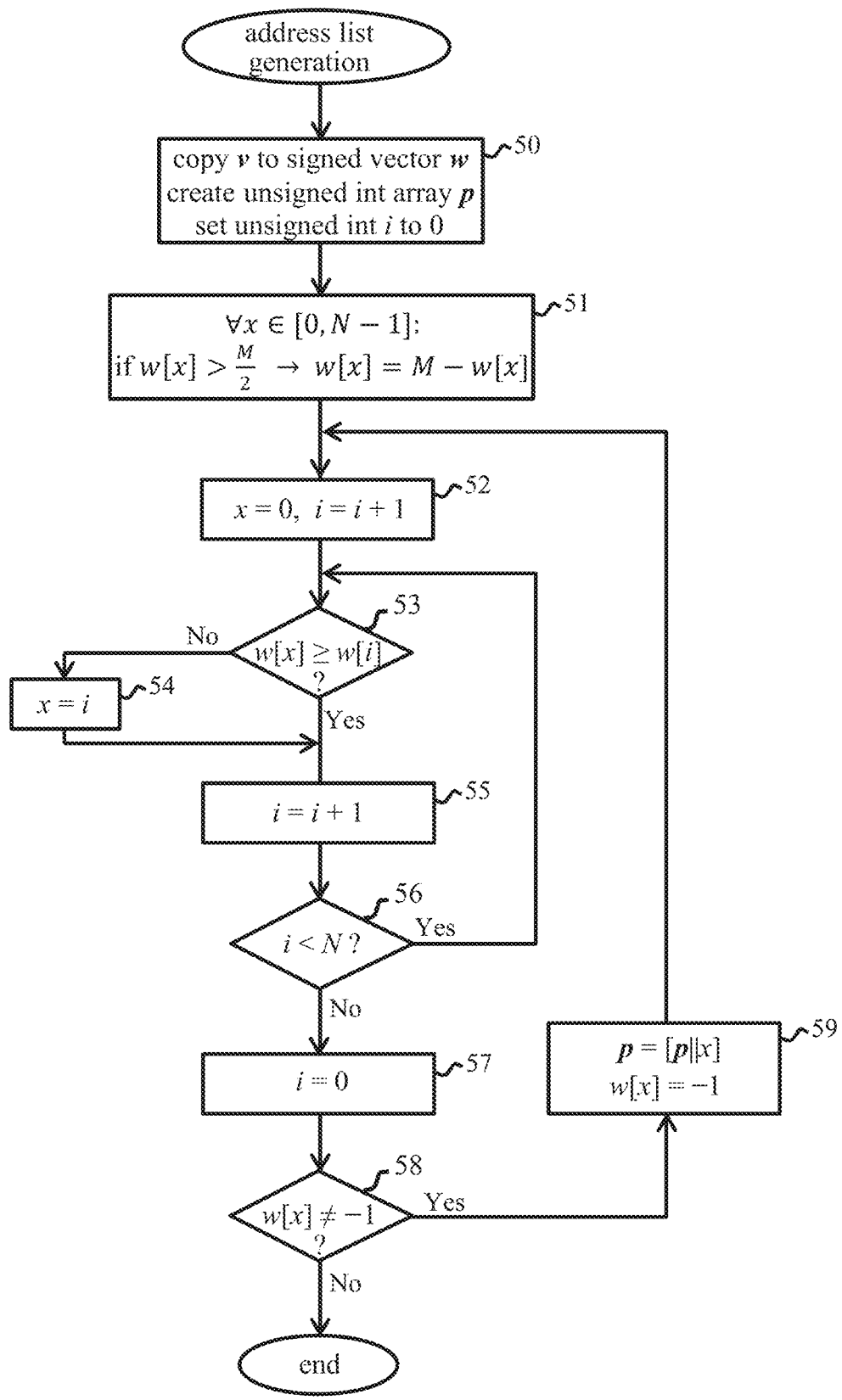

FIG. 4b shows the address list generation (step 32 of FIG. 3a) in this embodiment. In step 50, address list generator 7 copies the bias vector v to a signed float vector w, and creates an empty unsigned integer array p:p=[ ]. An unsigned integer index i is set to zero. In step 51, the address list generator rescales elements w[x] of the vector w to a scale of 0 to M/2. This reflects the fact, explained above, that entropy is equivalent for two cells biased to the same extent towards start-up values of 1 and 0. Step 52 sets the address index x to 0 and increments the index i. Step 53 then compares elements w[x] and w[i] (initially the first two elements w[0] and w[1]) of the vector w. If w[x] is at least as large as w[i], index i is incremented in step 55 and, if i<N in step 56, operation reverts to step 53 where w[x] is compared with the incremented w[i]. If w[x] is less than w[i] in any pass of step 53, then both x and i are incremented in steps 54 and 55. When i=N at step 56, the current value of x denotes the address of the highest-entropy cell (corresponding to the largest value of w[x]). Index i is reset to zero in step 57, and step 58 decides if w[x]=−1 (a termination condition for the sorting process). Assuming w[x]≠−1, operation proceeds to step 59. Here, the address x of the highest-entropy cell is concatenated at the end of array p, i.e. p=[p||x], and w[x] is overwritten with −1 in vector w (to remove element w[x] from further consideration in the sorting process). Operation then reverts to step 52 and the search is repeated for the address of the next-highest-entropy cell.

Figure 5:
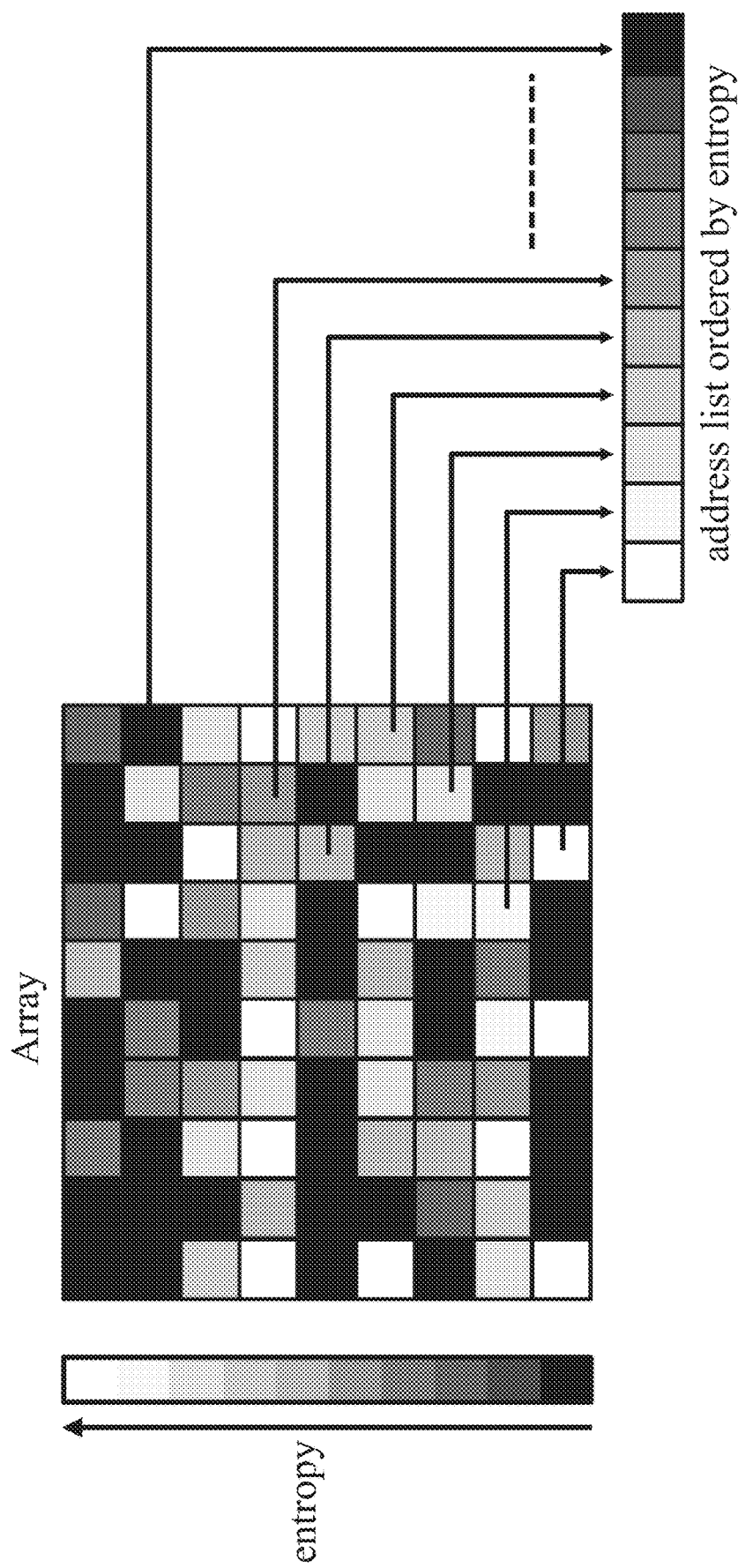
FIG. 5 is a schematic illustration of an address list generation process in embodiments of the invention.

The FIG. 4b process thus iterates, each iteration locating the address of the next-highest entropy cell and adding this address to the end of array p. At the end of the process (when w[x]=−1 in step 58, signifying that all elements have been sorted), the array p holds the address list in which all cell addresses in the array are listed in order of decreasing cell-entropy. This process is illustrated, in simplified form, in the schematic of FIG. 5 which shows an array of cells colored on a grey scale according to values of w[x] for each cell address. White cells correspond to maximum entropy (w[x]=M/2) and black cells correspond to zero entropy (w[x]=0). Where a number of cells have the same entropy, these cell-addresses will be grouped together in the address list, with the overall address progression being from higher to lower entropy as illustrated.

The number M of power-ups for the initialization phase can be selected to provide sufficient data for a statistically meaningful characterization of the cells based on entropy requirements of a particular application. For example, values of M between M≅10 and M≅100, and more preferably M≅20 and M≅100, may be used depending on application requirements. Values of M≅100 should be sufficient to fully characterize the cells to sufficient accuracy for most applications. However, preferred embodiments allow the initial characterization phase to be shortened, reducing M, as described further below.

When generating random strings from the array, the number of cells in the set selected for this purpose may vary in different embodiments. Some embodiments might read a predetermined number of bits. For example, all unstable cells, i.e., all cells which contribute some entropy (w[x]≠0), may be read in some embodiments, or the highest-entropy bits may be read up to a string-length specified for a particular crypto application. However, preferred embodiments can determine string-length according to entropy required by an application. These embodiments are described in more detail below. Whatever string-length is used, once the set of cells to be read has been selected, the particular order of the read bits in the string is of course irrelevant to the entropy content of the string.

The number N of SRAM cells used by HRNG 1 can be selected based on requirements of the crypto modules or other application using the random numbers. Larger arrays of course offer greater entropy as the number of unstable cells generally increases with array size. By way of example only, a lower bound for N may be 1024 for typical applications, and an array of N=2048 cells will generally provide sufficient entropy for most cryptographic protocols.

Figure 6:
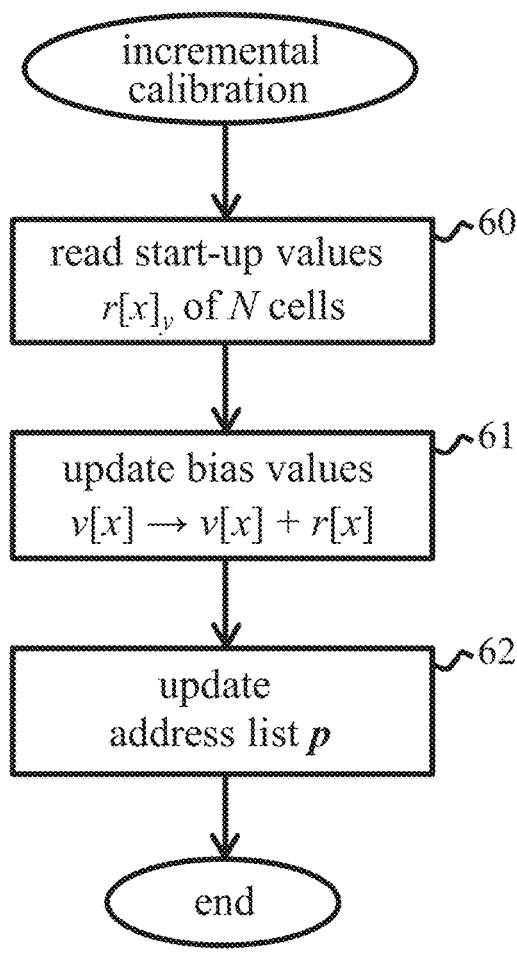
FIG. 6 shows steps of an incremental calibration process performed in preferred embodiments.

FIG. 6 shows steps of an incremental calibration process performed in preferred embodiments. This process can be performed on any power-up after the initialization process of FIG. 3*a*. In step 50, after power up of the array, SRAM controller 5 reads the start-up values r=r[x] (x=0 to N−1) of cells in the array. The start-up values are supplied to bias calculator 6 which then updates the stored bias vector v, as v=v+r, in step 51. The stored bias value v[x] for each cell is thus updated to v[x]+r[x] using the new cell start-up value. In step 52, address list generator 7 updates the address list p by re-performing the address ordering (FIG. 4*b*) based on the updated bias vector.

The FIG. 6 process (e.g., steps 60, 61 and 62) recalibrates the HRNG incrementally each time it is performed, refining the cell characterization based on cell start-up values for the current power-up. The recalibration can be performed in parallel with, or integrated in, the random string generation process of FIG. 3*b*. For example, the process may be performed on every array power-up after initialization, or on periodic power-ups. Some embodiments might also update the bias vector on each power-up, and update the address list on periodic power-ups. While bias values may be calculated in other ways as discussed below, calculating the bias values v[x] by accumulating the cell start-up values makes it particularly simple to update the bias vector and incrementally recalibrate the HRNG.

The incremental calibration process described above can allow the initialization phase to be shortened, reducing the number M of power-ups required for initialization. The incremental calibration may be performed R times up to a maximum total number T=(M+R) of power-ups deemed sufficient to fully characterize the array to a desired statistical accuracy. By way of example, T=100 will generally be adequate for full characterization.

The cell-level characterization performed by methods described above also allows the entropy of cells and random bit-strings to be statistically quantified. In particular, preferred embodiments can calculate entropy values for cells based on their respective bias values. The cell start-up values are essentially random variables, and the amount of entropy encoded in a bit-string produced from the cells depends on the probability distributions of these random variables. According to NIST (National Institute of Standards and Technology), minimum entropy measures the worst case of uncertainty in a random variable. If the random variable is the start-up value of cell si, and pimax is the maximum probability of a start-up value of 1 or 0, then the minimum entropy of the cell as a binary source of randomness can be defined by:

$$h_{min} = -\log_2(p_{imax}) \quad (1)$$

Assuming the n cells have independent start-up values, the minimum entropy of an n-bit string produced from n cell start-up values can be defined (as a percentage) by:

$$H_{min} = -\frac{1}{n}\sum_{i=1}^{n} \log_2(p_{imax}) \cdot 100 \quad (2)$$

Figure 7:
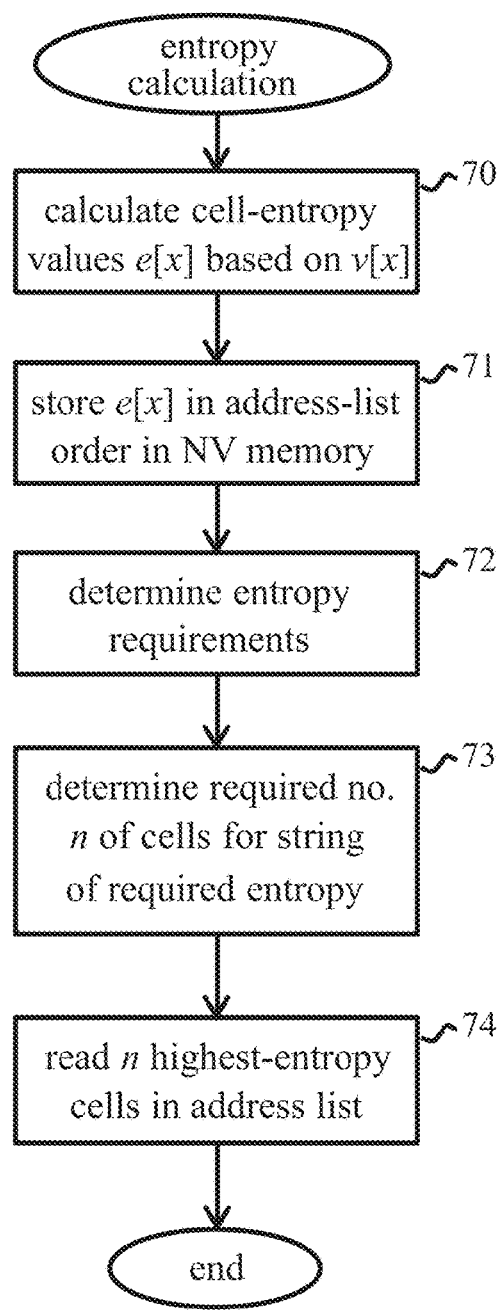
FIGS. 7 and 8 indicate additional steps of random bit-string generation methods in preferred embodiments.

Preferred embodiments can calculate entropy values for cells and use these entropy values to generate random strings with a required amount of entropy. FIG. 7 shows an example of this process. In step 70, the entropy calculator 9 of the preferred HRNG 1 calculates an entropy value e[x] for each cell sx based on the stored bias value v[x] for the cell. For example, e[x] can be calculated as the minimum cell entropy $h_{min}$ using Equation (1) above, with $$p_{imax} = w[x] / \left(\frac{M}{2}\right)$$

where w[w] is the re-scaled value of v[x] as described earlier. In step 71, the cell-entropy values e[x] are stored at 13 in NV memory 3, preferably in the same address order as the order of cell-addresses in the address list p. In step 72, the entropy calculator determines the amount of entropy required by the (or each) application, e.g. crypto module 19, for which random numbers are generated. This is typically predefined for crypto applications and specified at boot time. Subsequent steps are then performed for each application.

In step 73, the entropy calculator determines the number n of cells to be included in the set which is read to generate the random bit-string. In particular, based on the address list p and the stored entropy values e[x], a minimum value of n can be estimated from Equation (2) above. When a bit-string is subsequently generated for the application as indicated at step 74, at least the n highest-entropy cells in the address list will be selected for generating the bit-string. This enables the HRNG to supply a bit string with (at least) the required amount of entropy.

Steps of the FIG. 7 process may be integrated in various ways in the process of FIGS. 3*a* and 3*b*. For example, embodiments may be envisaged where the entropy calculations of steps 70 and 73 are performed dynamically in the string generation process of FIG. 3*b*. However, steps 70 to 73 can be conveniently integrated in the initialization process of FIG. 3*a*, with the required value(s) of n being stored in NV memory 3. Step 74 can then be performed in the string generation process of FIG. 3*b*. Entropy calculations can also be revised when the system is recalibrated and the address list updated.

Figure 8:
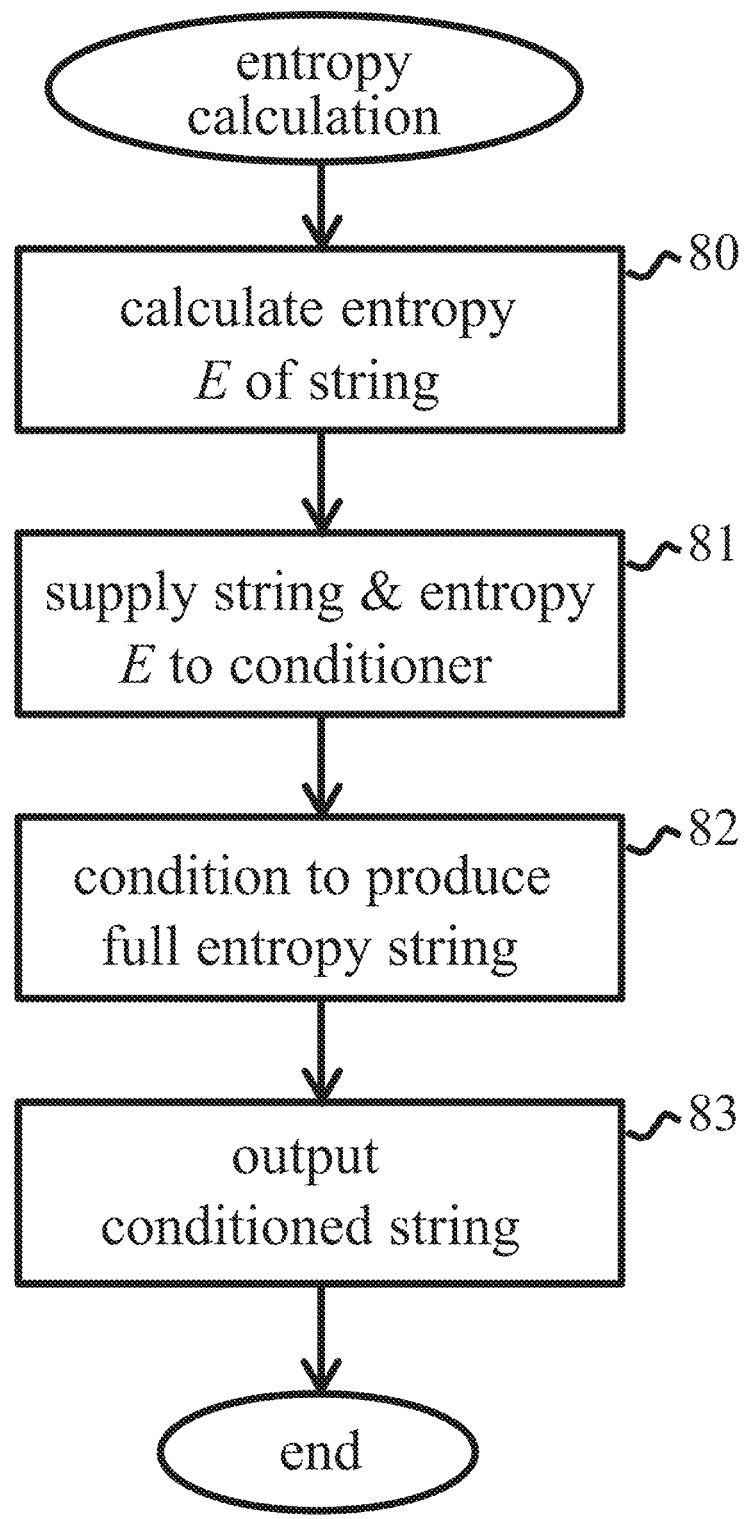

In some embodiments, the HRNG 1 may include a conditioner module 10 for conditioning random strings produced from SRAM array 2. Various conditioning algorithms are known in the art, and any such algorithm may be implemented in conditioner 10. A typical conditioner takes a random string, and an estimate of the entropy encoded in the string, and processes the string to distill a shorter string of conditioned bits with higher entropy, ideally full-entropy bits. FIG. 8 shows additional steps which may be used by such embodiments.

In step 80, entropy calculator 9 estimates the entropy E for a random string generated by RSG module 8 based on the entropy values for cells used to generate the string. The entropy E may be calculated as $E=H_{min}$ via Equation (2) above. In step 81, the random string from RSG module 8, and the entropy estimate E from entropy calculator 9, are supplied to conditioner 10. In step 82, the conditioner processes the string to produce a conditioned string with enhanced (ideally full) entropy. In step 83, the resulting conditioned string is then output for the application, e.g. to crypto module 19.

In some embodiments, the unconditioned, input string for step 80 may be a maximum-length string obtained by reading all unstable cells (for which $w[x] \neq 0$) in SRAM array 2. In others, this string may be that output by step 74 of FIG. 7, in which case the estimate of string-length n in step 73 may take account of entropy enhancement to be affected by conditioner 10.

Quantification of entropy in the above embodiments allows HRNGs to guarantee the entropy in random seeds/nonces supplied to cryptographic algorithms. By maximizing available entropy for a given string length, embodiments can also simplify conditioning processes performed for entropy enhancement.

It will be seen that embodiments described offer simple, efficient and low-cost generation of random numbers by HRNGs. These HRNGs may be used in any type of electronic device, including desktop, laptop and tablet computers, mobile phones, card readers/terminals, hand-held units, HSMs and other secure hardware devices, electronic tags, smart cards, e-tickets, IoT sensors, and so on.

It will of course be appreciated that many changes and modifications can be made to the exemplary embodiments described. By way of example, other sorting algorithms may be envisaged for the address ordering of FIG. 4b. In a modification to FIG. 4b, for instance, elements w[x] that have been sorted could be removed from vector w instead of being over-written with −1. Here, after removing the largest w[x] in each loop, the vector w can be re-written as w=(w[0:x−1], w[x+1:end]).

Cell bias values might be calculated in other ways, for instance as rescaled values w[x] or probabilities pimax. Various other formulae may also be envisaged for estimation of entropy values for cells and strings.

In some embodiments, the initialization process may use cell-start up values obtained with various different array supply-line voltages to reflect possible variations in array operating conditions. The initialization processes described may also be repeated in response to detection of some predetermined recalibration condition. For example, recalibration may be performed periodically to accommodate potential changes in operating conditions, or a recalibration condition may be detected in response to deterioration of entropy estimates in entropy calculator 9. Steps of FIG. 3a, and any related steps in preferred embodiments, can then be repeated after re-initializing all variables.

In general, where features are described herein with reference to a method embodying the invention, corresponding features may be provided in an HRNG or computer program product embodying the invention, and vice versa.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for generating a random bit-string from an array of SRAM (Static Random-Access Memory) cells, the method comprising:
   reading a start-up value of each cell over multiple power-ups of the array of SRAM cells;
   calculating, from the multiple start-up values of each cell, a bias value indicative of entropy of that cell from the array of SRAM cells;
   generating, based on the bias values, an address list in which addresses of cells in the array are listed in order of entropy of cells from the array of SRAM cells of SRAM cells;
   storing the address list in non-volatile memory; and
   on a subsequent power-up of the array of SRAM cells, generating a random bit-string by reading the start-up values of a set of cells selected in decreasing entropy order of the address list.

2. The method as claimed in claim 1 including storing the bias values in non-volatile memory.

3. The method as claimed in claim 2 including, on the subsequent power-up of the array of SRAM cells, updating the stored bias value for each cell using the cell start-up value at that power-up.

4. The method as claimed in claim 3 including updating the address list based on the updated stored bias values.

5. The method as claimed in claim 1 including generating the random bit-string with a required amount of entropy by:
   calculating entropy values for cells based on their respective bias values; and
   based on the calculated entropy values, selecting sufficient cells in the set to provide the required amount of entropy in the random bit-string.

6. The method as claimed in claim 5 including:
   storing the entropy values for cells, in the order of cell addresses in the address list, in the non-volatile memory.

7. The method as claimed in claim 6 including conditioning the random bit-string, based on the entropy values for cells in the set, to produce a conditioned string with enhanced entropy.

8. The method as claimed in claim 1 including calculating the bias value for each cell by accumulating the start-up values of the cell.

9. The method as claimed in claim 1 including, in response to detection of a recalibration condition:
   re-reading the start-up value of each cell over multiple power-ups of the array of SRAM cells;
   recalculating the bias value for each cell from the re-read start-up values of that cell;
   regenerating the address list based on the recalculated bias values; and
   storing the regenerated address list in non-volatile memory.

10. A hardware random number generator comprising:
    an array of SRAM cells;
    non-volatile memory storing an address list in which addresses of cells in the array of SRAM cells are listed in order of entropy of the cells; and
    control logic adapted, on a power-up of the array of SRAM cells, to generate a random bit-string by reading the start-up values of a set of cells selected in decreasing entropy order of the address list.

11. The hardware random number generator as claimed in claim 10 wherein the control logic is adapted to generate the address list by:
    reading a start-up value of each cell over multiple power-ups of the array of SRAM cells;
    calculating, from the multiple start-up values of each cell, a bias value indicative of entropy of the cell;
    based on the bias values, listing addresses of cells in order of the entropy of the cells; and
    storing the address list in the non-volatile memory.

12. The hardware random number generator as claimed in claim 11 wherein the control logic is further adapted to store the bias values in the non-volatile memory.

13. The hardware random number generator as claimed in claim 12 wherein the control logic is further adapted, on the subsequent power-up of the array of SRAM cells, to update the stored bias value for each cell using the cell start-up value at that power-up.

14. The hardware random number generator as claimed in claim 13 wherein the control logic is further adapted to update the address list based on the updated bias values.

15. The hardware random number generator as claimed in claim 12 wherein the control logic is further adapted to generate the random bit-string with a required amount of entropy by:
    calculating entropy values for cells based on their respective bias values; and
    based on the calculated entropy values, selecting sufficient cells in the set to provide the required amount of entropy in the random bit-string.

16. The hardware random number generator as claimed in claim 15 wherein the control logic is further adapted to:
    store the entropy values for cells, in the order of cell addresses in the address list, in the non-volatile memory.

17. The hardware random number generator as claimed in claim 16 wherein the control logic is further adapted to condition the random bit-string, based on the entropy values for cells in the set, to produce a conditioned string with enhanced entropy.

18. The hardware random number generator as claimed in claim 11 wherein the control logic is adapted to calculate the bias value for each cell by accumulating the start-up values of the cell.

19. The hardware random number generator as claimed in claim 11 wherein the control logic is further adapted, in response to detection of a recalibration condition, to:
    cells;
    re-read the start-up value of each cell over multiple power-ups of the array of SRAM recalculate the bias value for each cell from the re-read start-up values of that cell;
    regenerate the address list based on the recalculated bias values; and
    store the regenerated address list in the non-volatile memory.

20. A computer program product for generating a random bit-string from an array of SRAM cells, the computer program product comprising a computer readable storage medium having program instructions embodied therein, the program instructions being executable by a processing device to cause the processing device to:
    read a start-up value of each cell over multiple power-ups of the array of SRAM cells;
    calculate, from the multiple start-up values of each cell, a bias value indicative of entropy of the cell;
    generate, based on the bias values, an address list in which addresses of cells in the array of SRAM cells are listed in order of the entropy of the cells;
    store the address list in non-volatile memory; and
    on a subsequent power-up of the array of SRAM cells, generate a random bit-string by reading the start-up values of a set of cells selected in decreasing entropy order of the address list.

* * * * *